US008335719B1

(12) United States Patent
Quraishi et al.

(10) Patent No.: US 8,335,719 B1
(45) Date of Patent: Dec. 18, 2012

(54) GENERATING ADVERTISEMENT SETS BASED ON KEYWORDS EXTRACTED FROM DATA FEEDS

(75) Inventors: Waseem S. Quraishi, Seattle, WA (US); Joel Andrew Shapiro, Seattle, WA (US)

(73) Assignee: Amazon Technologies, Inc., Reno, NV (US)

( * ) Notice: Subject to any disclaimer, the term of this patent is extended or adjusted under 35 U.S.C. 154(b) by 741 days.

(21) Appl. No.: 11/768,737

(22) Filed: Jun. 26, 2007

(51) Int. Cl.
*G06Q 30/00* (2006.01)
(52) U.S. Cl. ............... 705/14.49; 705/14.52; 705/14.53; 705/14.66; 705/14.67
(58) Field of Classification Search ............... 705/14.43, 705/14.52, 14.53, 14.49, 14.66, 14.67
See application file for complete search history.

(56) References Cited

U.S. PATENT DOCUMENTS

| | | | |
|---|---|---|---|
| 6,785,671 B1* | 8/2004 | Bailey et al. ....................... | 707/3 |
| 7,478,089 B2* | 1/2009 | Henkin et al. ..................... | 707/5 |
| 7,979,459 B2* | 7/2011 | Wu et al. ........................... | 707/769 |
| 2005/0289140 A1* | 12/2005 | Ford et al. ......................... | 707/5 |
| 2006/0080321 A1* | 4/2006 | Horn et al. ........................ | 707/10 |
| 2006/0149710 A1* | 7/2006 | Koningstein et al. ............ | 707/3 |
| 2006/0242663 A1* | 10/2006 | Gogerty ............................. | 725/34 |
| 2008/0320384 A1* | 12/2008 | Nagarajan ........................ | 715/255 |

FOREIGN PATENT DOCUMENTS

| | | | |
|---|---|---|---|
| WO | WO9802835 A1 * | 1/1998 | |
| WO | WO9955066 A1 * | 10/1999 | |
| WO | WO0186390 A2 * | 11/2001 | |
| WO | WO2005003920 A2 * | 1/2005 | |

OTHER PUBLICATIONS www.proudlyserving.com—Statistically Improbable Phrases—Mar. 2005. (PDF of document provided to applicant with this Office Action).*

* cited by examiner

*Primary Examiner* — Michael Bekerman
*Assistant Examiner* — Luis Brown
(74) *Attorney, Agent, or Firm* — Novak Druce + Quigg LLP (57) ABSTRACT

A method and system for generating advertisement sets for keywords automatically extracted from data feeds is provided. An advertisement system receives various data feeds. The advertisement system may on a periodic or an ad hoc basis request a feed server to provide the latest feed having feed items. Each feed item may include a title, a description, and a link to an associated web site. To generate an advertisement set, which includes an advertisement, a keyword, and a link to a landing page, the advertisement system extracts a keyword from a feed item, identifies a category for advertising using the extracted keyword, generates an advertisement (or "creative") for advertising that category, and generates a landing page link associated with the category. The advertisement system then submits the advertisement set to an advertisement placement service for placement along with content that is somehow related to the keyword.

27 Claims, 11 Drawing Sheets

FIG. 1 keyword table 112

| keyword | keyword type | current count | decay count | feed id | ad score | ad category | ad submitted |
|---|---|---|---|---|---|---|---|
| Harry Potter | proper noun | 20 | 10 | | 8 | DVD | Y |
| second derivative | SIP | 3 | 0 | | 5 | books | N |
| Playstation released | title | 5 | 0 | | 4 | electronics | N |

GENERATING ADVERTISEMENT SETS BASED ON KEYWORDS EXTRACTED FROM DATA FEEDS

TECHNICAL FIELD

The described technology relates generally to calculating bid amounts for advertisements that are keyword-targeted.

BACKGROUND

Many search engine services, such as Google, Yahoo!, and MSN, provide for searching for information that is accessible via the Internet. These search engine services allow users to search for web pages and other Internet-accessible resources that may be of interest to users. After a user submits a search request that includes search terms, the search engine service identifies web pages that may be related to those search terms. The collection of web pages that most closely match the search terms is referred to as the "search result." The search engine service then ranks the web pages of the search result based on the closeness of each match, web page popularity (e.g., Google's page ranking), and so on. The search engine service then displays to the user links to those information sources in an order that is based on their rankings.

Some search engine services do not charge a fee to the providers of web pages for including links to their web pages in search results. Rather, the search engine services obtain revenue by placing advertisements along with search results. These paid-for advertisements are commonly referred to as "sponsored links," "sponsored matches," or "paid-for search results." A vendor who wants to place an advertisement along with certain search results provides a search engine service with a creative and search terms. When a search request is received, the search engine service identifies the advertisements whose search terms match those of the search request. The search engine service then may display some of the advertisements along with the search results.

DETAIL DESCRIPTION

A method and system for generating advertisement sets for keywords automatically extracted from data feeds is provided. A data feed (or feeds) is any structured information that is published to indicate that content of a web page has been updated. Feed data typically contain a summary of the updated content and a link to the content. In some embodiments, an advertisement system receives various RSS-style data feeds such as a really simple syndication feed, a resource description framework site summary feed, and a rich site summary feed. The advertisement system may on a periodic or an ad hoc basis request a feed server to provide the latest data feed. A data feed may include feed (or channel) information and multiple feed items. Each feed item may include a title, a description, and a link to an associated web site. To generate an advertisement set, which typically includes a creative, a keyword, a link to a landing page, and a bid amount the advertiser is willing to spend to place the advertisement, the advertisement system extracts a keyword from a feed item, identifies a category for advertising using the extracted keyword, generates a creative for advertising that category, and generates a landing page link associated with the category. The advertisement system then submits the advertisement set to an advertisement placement service for placement along with content that is somehow related to the keyword. For example, the creative of an advertisement set may be placed along with search results generated from a query that includes the keyword of the advertisement set.

In some embodiments, the advertisement system extracts keywords from the feed items of the RSS-style data feeds that have been received and stored. The keywords of the feed items may include proper nouns, statistically improbable phrases, capitalized phrases, and so on extracted from the description or title of a feed item. The advertisement system then identifies, for each extracted keyword, a category (e.g., books, DVDs, consumer electronics, and home appliances) of products to be advertised using that extracted keyword. For example, if the keyword is "Harry Potter," the category may be DVDs. The advertisement system may identify a category based on the expected benefit, such as expected profitability or expected revenue, from submitting an advertisement for products of that category using the extracted keyword. The advertisement system then generates a link for a landing page based on the extracted keyword and the identified category. For example, the link may correspond to a web page of search results for a product search within the identified category using the keyword as the query. In such a case, the landing page may provide links to products within that category that are related to the keyword of the advertisement set. The advertisement system may also generate a creative for the advertisement set. The creative may contain text and graphics to advertising an item, category of items, web site, and so on. For example, when the advertisement set is for a sponsored link, the advertisement system may set the first line of the creative to contain the keyword plus the identification of the vendor (e.g., "Harry Potter at Acme.com"). The advertisement system may set the second line of the creative to category-specific text. For example, if the identified category is DVDs, then the category-specific text may be "Buy DVDs at 10% off," and if the identified category is home appliances, then the category-specific text may be "World's largest collection of appliances." The advertisement system then submits the advertisement set including the extracted keyword, the generated link, the generated creative to an advertisement placement service, and a bid amount.

In some embodiments, the advertisement system may identify a category for the landing page of an advertisement set based on the expected benefit for advertising products of that category using the extracted keyword. The advertisement system may base the selection of the category on analysis of profitability of advertising in certain categories and advertising with the extracted keyword in certain categories. The advertisement system may generate a score for each category representing the benefit of advertising using the extracted keyword in that category. For example, the advertisement system may generate the score for a category based on how many products within that category relate to the extracted keyword, the profitability of advertisements generally in that category, the conversion rate for advertisements in that category, overall goals of promoting certain categories, and so on. The advertisement system then identifies the category with the highest score as a benefit-based category.

In some embodiments, the advertisement system may identify a category based on user activity relating to search results of a keyword submitted as a query. The advertisement system may analyze clickthrough logs to identify different types of user activity such as selecting an item of the search results, adding an item to a shopping cart, purchasing an item, and so on. When the user activity occurs a short time after submission of the query, the advertisement system may assume the user activity relates to the query. The advertisement system may generate an overall score for each category for a query by combining scores generated for each type of user activity for the query. For example, the advertisement system may generate a score for the purchasing activity based on the number of times users purchased items in that category after submitting the query and the total number of times users submitted that query. The advertisement system may apply a decay factor to the user activity so that less recent user activity is given less weight. For example, a purchase of an item last month will be given less weight than the purchase of an item yesterday. The advertisement system may also weight user activity based on recency of the activity to the submission of the query. Thus, user activity that occurs one minute after submission of the query may be weighted less than user activity that occurs 15 minutes after the submission. The advertisement system may also weight the scores of the different types of user activity differently. For example, the purchasing of an item may be weighted more heavily than adding the item to a shopping cart. One skilled in the art will appreciate that various techniques may be used to learn the decay factors and weights such as linear or non-linear regression, Bayesian techniques, and so on. The analysis of user activity is described in U.S. Patent Application No. 2005/0222987 entitled "Automated Detection of Associations Between Search Criteria and Item Categories based on Collective Analysis of User Activity Data," filed on Apr. 2, 2004, which is hereby incorporated by reference.

If the advertisement system has a collection of books (or more generally documents), then the advertisement system may also generate a score for the category of books based, at least in part, on the number of occurrences of the keyword within the collection of books. If the keyword happens to be a statistically improbable phrase, then the advertisement system may generate another score for the category of books based, at least in part, on the number of occurrences of that statistically improbable phrase within the collection of books. Statistically improbable phrases ("SIPs") are distinctive phrases in texts of books of the collection. If a phrase occurs a large number of times in a particular book relative to other books in the collection, then that phrase is considered to be a statistically improbable phrase within that book. Thus, a statistically improbable phrase is not improbable within a particular book but is improbable relative to all books in the collection. The advertisement system selects either the benefit-based category or the books category with the highest score for use in advertising with the extracted keyword. The advertisement system may normalize the scores so that they can be directly compared.

In some embodiments, the advertisement system may extract keywords that are proper nouns, statistically improbable phrases, and capitalized phrases. The advertisement system may identify proper nouns based on capitalization of the first letter in each word in a sequence of words. For example, "Harry Potter" would be considered a proper noun because of the capital "H" and the capital "P." As described above, a statistically improbable phrase is a phrase that, while improbable within a collection of documents, occurs frequently within one of the documents in the collection. The advertisement system may be provided with a list of statistically improbable phrases from a collection of books that are available for sale. The advertisement system may identify as keywords those statistically improbable phrases that occur in a feed item. The advertisement system may identify capitalized phrases as a phrase with capitalization of the first letter in each non-noise word in sequence. For example, if a feed item contains the phrase "United States of America," then the advertisement system may identify the capitalized phrase "United States of America."

In some embodiments, the advertisement system may periodically (although it may also be on a non-periodic basis) process RSS-style data feeds to extract new keywords and generate advertisement sets for those extracted keywords. This processing may be referred to as an extraction cycle. In between extraction cycles, the advertisement system may collect RSS-style data feeds on a periodic (e.g., hourly, daily, or weekly) or non-periodic (e.g., when user interest in a vendor's web site is waning) basis. The advertisement system stores the collected RSS-style data feeds in a feed store. For extraction cycle processing, the advertisement system may maintain a keyword table for tracking keywords that have been previously extracted. The keyword table contains information for determining when to submit the advertisement set for each keyword, when to remove a keyword from the keyword table, and so on. The advertisement system, after extracting new keywords from the RSS-style data feeds and generating the corresponding advertisement sets, may select some of the advertisement sets for submission to an advertisement placement service. The advertisement system may generate a score for each advertisement set that reflects the expected benefit of submitting the advertisement set, recency of occurrences of the keyword of the advertisement set within the feed items, and so on. The advertisement system then selects advertisement sets based on their scores and submits those advertisement sets to an advertisement placement service. The advertisement system may also re-submit advertisement sets that were previously placed.

Figure 1:
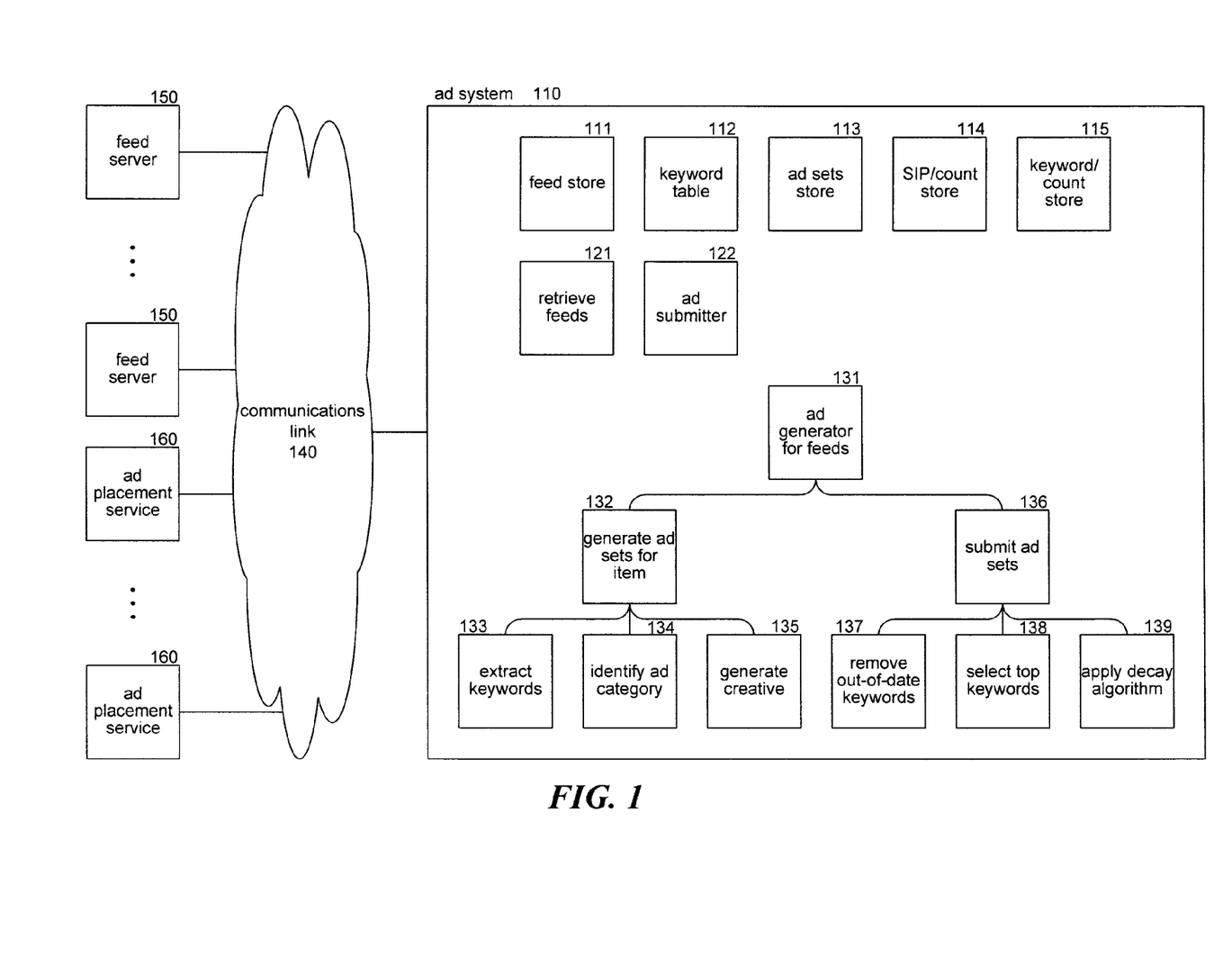
FIG. 1 is a block diagram that illustrates components of the advertisement system in some embodiments.

FIG. 1 is a block diagram that illustrates components of the advertisement system in some embodiments. The advertisement system 110 is connected to feed servers 150, and advertisement placement services 160 via a communications link 140. The advertisement system 110 includes a feed store 111, a keyword table 112, an advertisement sets store 113, a SIP/ count store 114, and a keyword/count store 115. The feed store 111 contains the feed items collected from the various feed servers 150. The keyword table 112 contains information relating to the keywords extracted from the feed items. The advertisement sets store 113 contains the advertisement sets generated for the extracted keywords. The SIP/count store 114 contains the number of occurrences of each statistically improbable phrase within a collection of books. The keyword/count store 115 contains the number of occurrences of each keyword within a collection of books. The advertisement system 110 also includes a retrieve feeds component 121 and an advertisement submitter component 122. The retrieve feeds component 121 submits requests to the feed servers 150, receives data feeds in response, and stores the feed items to the data feed in the feed store 111. The advertisement submitter component 122 submits advertisements to the advertisement placement services 160.

The advertisement system 110 also includes an advertisement generator for feeds component 131, a generate advertisement sets for item component 132, an extract keywords component 133, an identify advertisement category component 134, a generate creative component 135, a submit advertisement sets component 136, a remove out-of-date keywords component 137, a select top keywords component 138, and an apply decay algorithm component 139. The advertisement generator for feeds component 131 invokes the generate advertisement sets for item component 132 for each feed item of a data feed. The generate advertisement sets for item component 132 invokes the extract keywords component 133, the identify advertisement category component 134, and the generate creative component 135 to create advertisement sets for the keywords of the item feed. The advertisement generator for feeds component 131 also invokes the submit advertisement sets component 136 to identify advertisement sets to submit. The submit advertisement sets component 136 invokes the remove out-of-date keywords component 137, the select top keywords component 138, and the apply decay algorithm component 139 to identify advertisement sets to be submitted to the advertisement submitter component 122.

Figure 2:
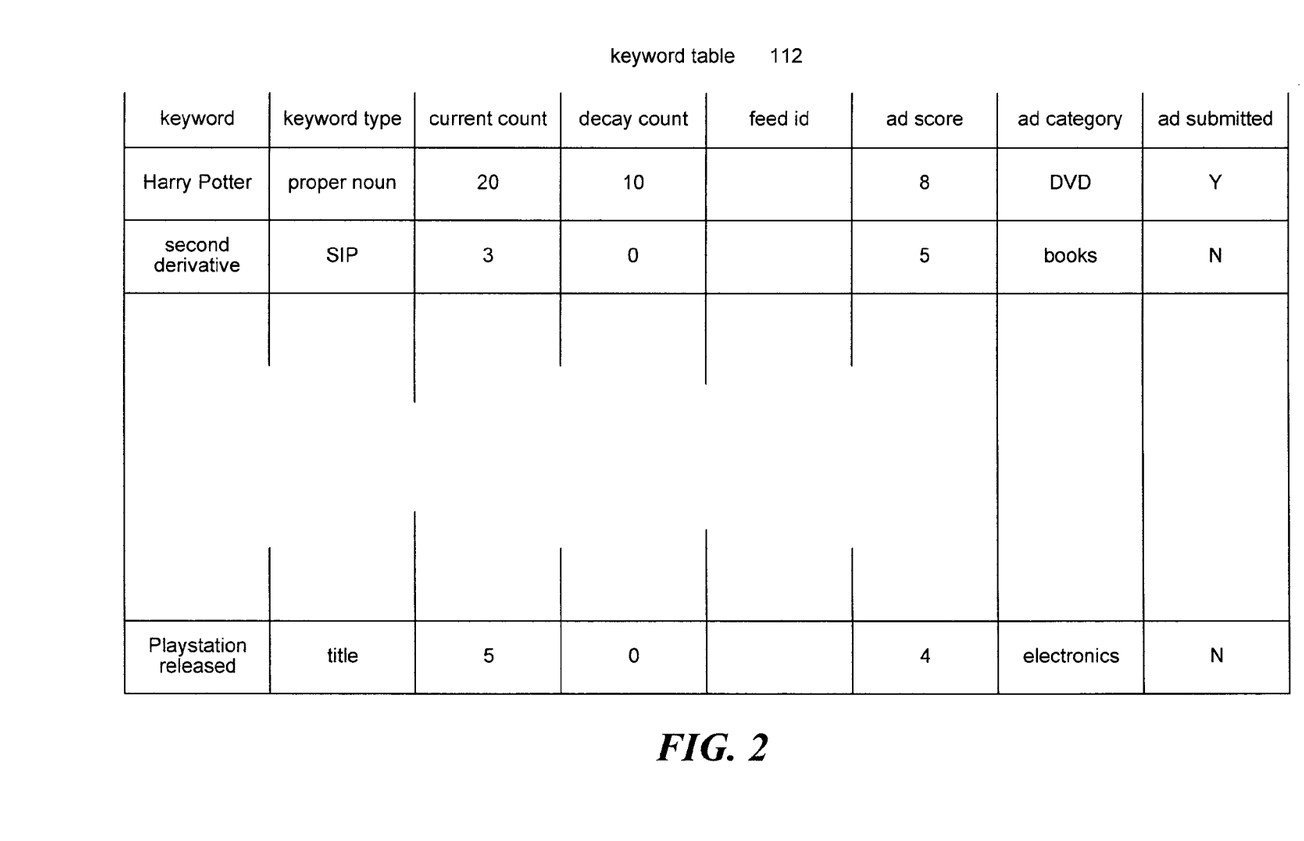
FIG. 2 is a block diagram that provides a logical overview of information of a keyword table.

FIG. 2 is a block diagram that provides a logical overview of information of a keyword table. The keyword table 112 includes an entry for each keyword that has been extracted from a data feed. Each entry contains the keyword, a keyword type, a current count, a decay count, a feed identifier, an advertisement score, an advertisement category, and an advertisement submitted flag. The keyword type indicates whether the extracted keyword is a proper noun, a statistically improbable phrase, a capitalized phrase, or a title. The current count indicates the count of the number of times the keyword was extracted from feed items during the current extraction cycle. The decay count indicates a count derived from previous extraction cycles. At each new extraction cycle, the advertisement system may update the decay count based on the current count and the previous decay count. For example, the new decay count may be one-half the current count plus one-quarter the decay count. Because the advertisement system factors in the decay count in determining whether to select a keyword for advertising, the influence of prior keyword extraction cycles on this determination will diminish over time. The feed identifier identifies the RSS-style feed from which the keyword was first extracted. The advertisement score indicates an estimated benefit for placing an advertisement with the keyword. The advertisement category identifies the category of products to advertise with the keyword. The advertisement submitted flag indicates whether an advertisement set for this keyword has already been submitted.

The computing device on which the advertisement system is implemented may include a central processing unit, memory, input devices (e.g., keyboard and pointing devices), output devices (e.g., display devices), and storage devices (e.g., disk drives). The memory and storage devices are computer-readable media that may be encoded with computer-executable instructions that implement the system, which means a computer-readable medium that contains the instructions. A computer-readable medium may be a computer program product comprising computer readable program code means that implement functions of the system. In addition, the instructions, data structures, and message structures may be stored or transmitted via a data transmission medium, such as a signal on a communications link. Various communications links may be used, such as the Internet, a local area network, a wide area network, a point-to-point dial-up connection, a cell phone network, and so on.

Embodiments of the advertisement system may be implemented in or used in conjunction with various operating environments that include personal computers, server computers, hand-held or laptop devices, multiprocessor systems, microprocessor-based systems, programmable consumer electronics, digital cameras, network PCs, minicomputers, mainframe computers, cell phones, personal digital assistants, smart phones, personal computers, programmable consumer electronics, distributed computing environments that include any of the above systems or devices, and so on.

The advertisement system may be described in the general context of computer-executable instructions, such as program modules, executed by one or more computers or other devices. Generally, program modules include routines, programs, objects, components, data structures, and so on that perform particular tasks or implement particular abstract data types. Typically, the functionality of the program modules may be combined or distributed as desired in various embodiments.

Figure 3:
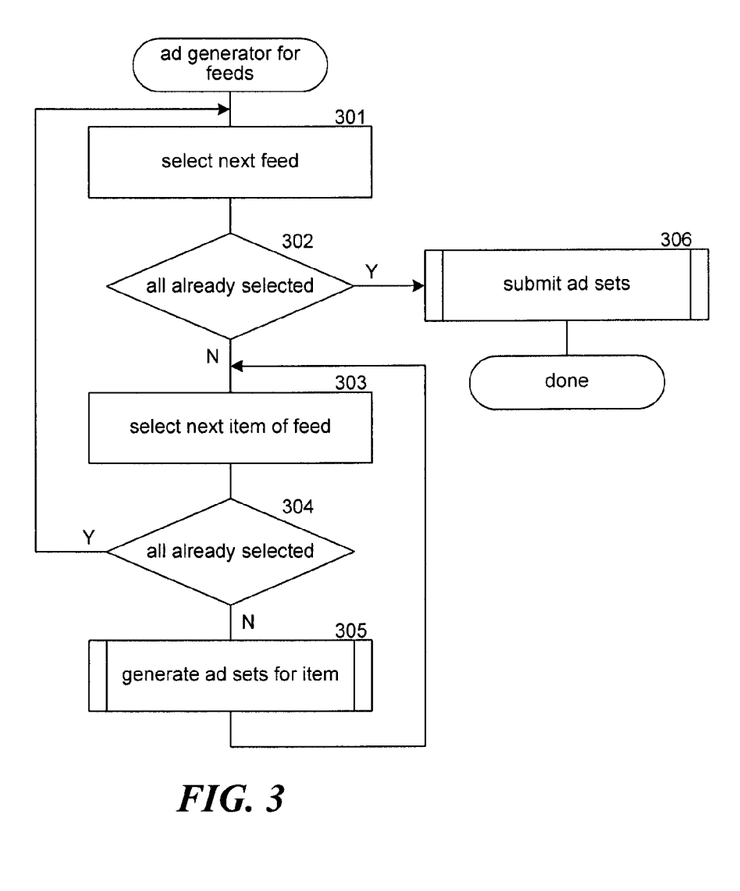
FIG. 3 is a flow diagram that illustrates the processing of the advertisement generator for feeds component of the advertisement system in some embodiments.

FIG. 3 is a flow diagram that illustrates the processing of the advertisement generator for feeds component of the advertisement system in some embodiments. The component implements a keyword extraction cycle by extracting keywords from the feed items, generating advertisement sets for the keywords, and submitting advertisement sets for placement. In block 301, the component selects the next feed of the feed store. In decision block 302, if all the feeds have already been selected, then the component continues at block 306, else the component continues at block 303. In blocks 303-305, the component generates advertisement sets for the keywords of each feed item of the selected feed. In block 303, the component selects the next feed item of the selected feed. In decision block 304, if all the feed items have already been selected, then the component loops to block 301 to select the next feed, else the component continues at block 305. In block 305, the component invokes the generate advertisement sets for item component to generate advertisement sets for the keywords of the selected feed item. The component then loops to block 303 to select the next feed item. In block 306, the component invokes the submit advertisement sets component to identify advertisement set to submit to an advertisement placement service. The component then completes.

Figure 4:
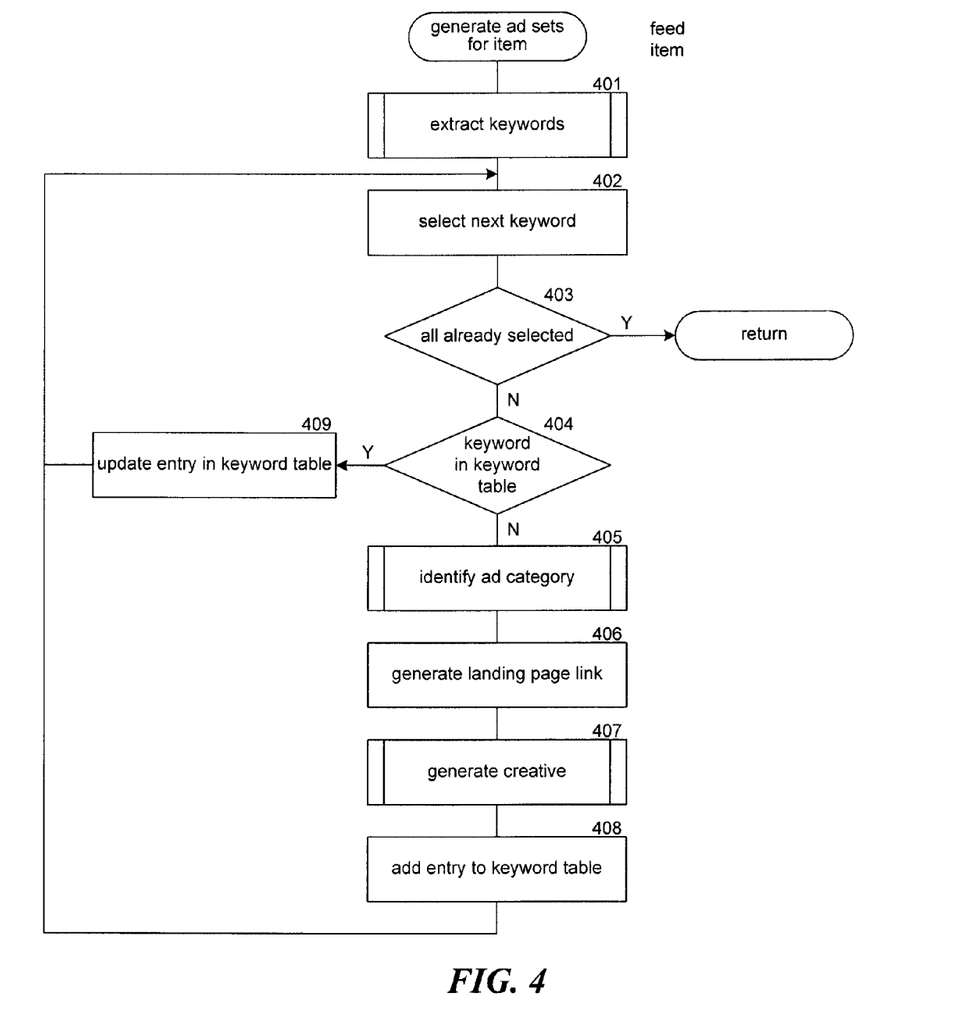
FIG. 4 is a flow diagram that illustrates the processing of the generate advertisement sets for item component of the advertising system in some embodiments.

FIG. 4 is a flow diagram that illustrates the processing of the generate advertisement sets for item component of the advertising system in some embodiments. The component is passed a feed item and generates advertisement sets for the keywords of the feed item. In block 401, the component invokes the extract keywords component to extract the keywords from the feed item. In blocks 402-409, the component loops generating advertisement sets for each newly identified keyword. In block 402, the component selects the next keyword. In decision block 403, if all the keywords have already been selected, then the component returns, else the component continues at block 404. In decision block 404, if a keyword is already in the keyword table, then the component continues at block 409, else the keyword is a new keyword and the component continues at block 405. In block 405, the component invokes the identify advertisement category component to identify an advertisement category for the selected keyword. In block 406, the component generates a landing page link for the selected keyword and the identified category. In block 407, the component invokes the generate creative component to create a creative for the selected keyword and the identified category. In block 408, the component adds an entry to the keyword table and then loops to block 402 to select the next extracted keyword. In block 409, the component updates the existing entry in the keyword table for this selected keyword (e.g., increments its count). The component then loops to block 402 to select the next extracted keyword.

Figure 5:
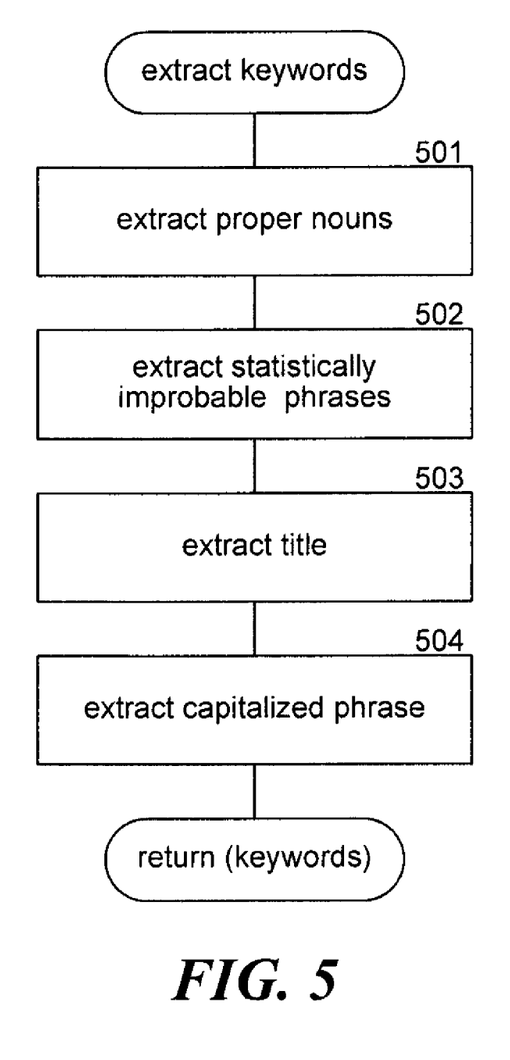
FIG. 5 is a flow diagram that illustrates the processing of the extract keywords component of the advertisement system in some embodiments.

FIG. 5 is a flow diagram that illustrates the processing of the extract keywords component of the advertisement system in some embodiments. The component is passed a feed item and extracts keywords from the feed item. In block 501, the component extracts the proper nouns from the feed item. In block 502, the component extracts statistically improbable phrases from the feed item. In block 503, the component extracts the title from the feed item. In block 504, the component extracts capitalized phrases from the feed item. The component then returns the extracted keywords. One skilled in the art will appreciate that statistically improbable phrases may be identified in many different ways such as using conventional term frequency by inverse document frequency (td*idf) techniques or variations thereof.

Figure 6:
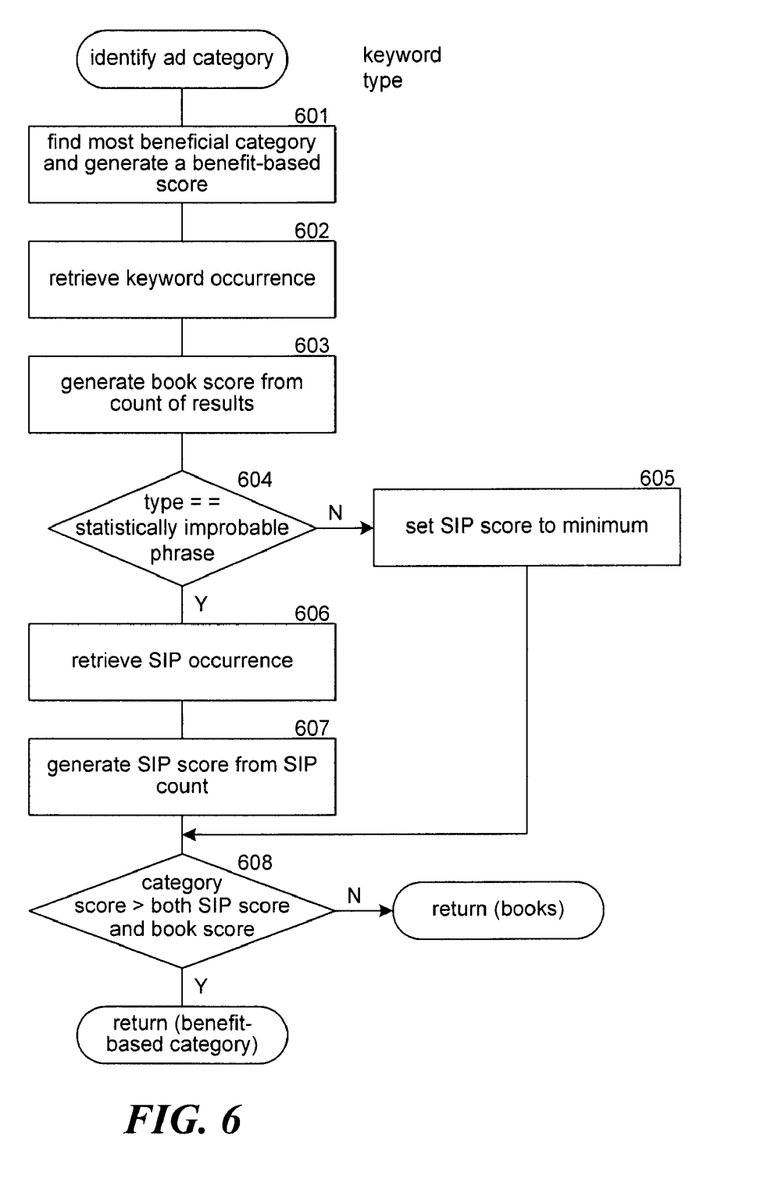
FIG. 6 is a flow diagram that illustrates the processing of the identify advertisement category component of the advertisement system in some embodiments.

FIG. 6 is a flow diagram that illustrates the processing of the identify advertisement category component of the advertisement system in some embodiments. The component is passed a keyword and a keyword type and identifies an appropriate category for advertising with that keyword. The keyword type indicates the basis for identifying the keyword, such as a proper noun, statistically improbable phrase, capitalized phrase, or title. In block 601, the component finds a category with the highest estimated profitability for advertising the keyword and generates a benefit-based score for that category. In block 602, the component retrieves the number of the occurrences of the keyword from the keyword/count store. In block 603, the component generates a book score from the number of occurrences. In decision block 604, if the type of the keyword is statistically improbable phrase, then the component continues at block 606, else the component continues at block 605. In block 605, the component sets a SIP score to the minimum possible score and then continues at block 608. In block 606, the component retrieves a SIP count from the SIP/count store. In block 607, the component generates a SIP score from the count. In decision block 608, the component identifies which score satisfies a category selection criterion. For example, if the category score is greater than both the SIP score and the book score, then the component returns the benefit-based category as the selected category, else the component returns the books category as the selected category. The component may normalize the various scores so they can be directly compared. For example, if the benefit-based score ranges between 0 and 100, then the book counts and SIP counts may be mapped to that range.

Figure 7:
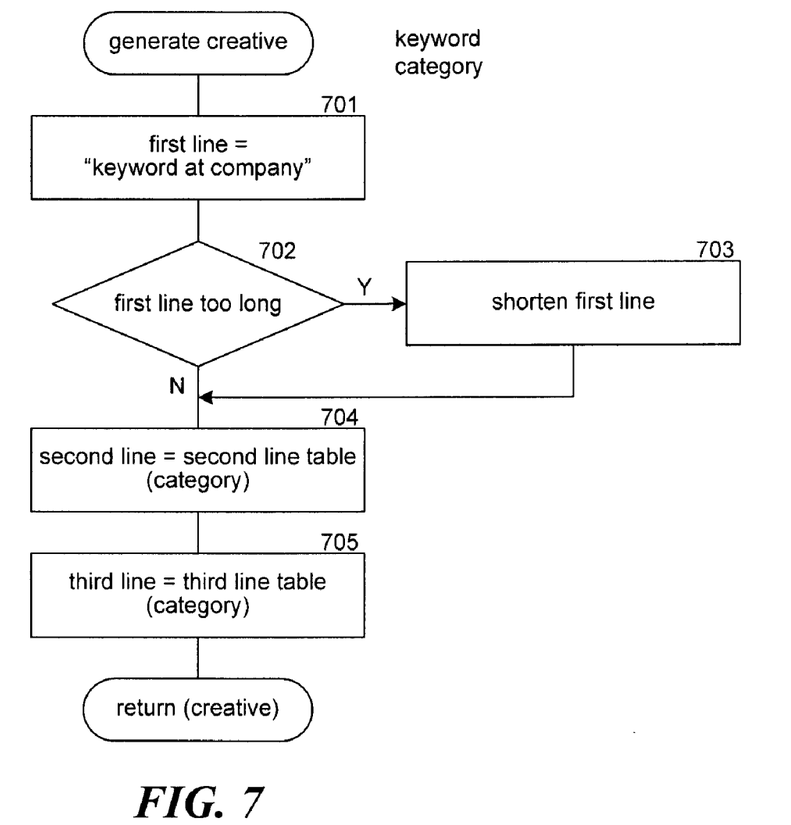
FIG. 7 is a flow diagram that illustrates the processing of the generate creative component of the advertisement system in some embodiments.

FIG. 7 is a flow diagram that illustrates the processing of the generate creative component of the advertisement system in some embodiments. The component is passed a keyword and a category and generates a creative for a sponsored link. In block 701, the component sets the first line of the creative to the keyword and the vendor's name. In decision block 702, if the first line is too long, then the component continues at block 703, else the component continues at block 704. In block 703, the component shortens the first line. For example, the component may attempt to remove words of the keyword (including all the words) until the first line is not too long. In block 704, the component sets the second line of the creative to category-specific text. In block 705, the component sets the third line of the creative to category-specific text. For example, the third line may indicate special shipping rates for different categories. The component then returns. One skilled in the art will appreciate that creatives can contain different types of content, such as text, graphics, video, sound, and so on.

Figure 8:
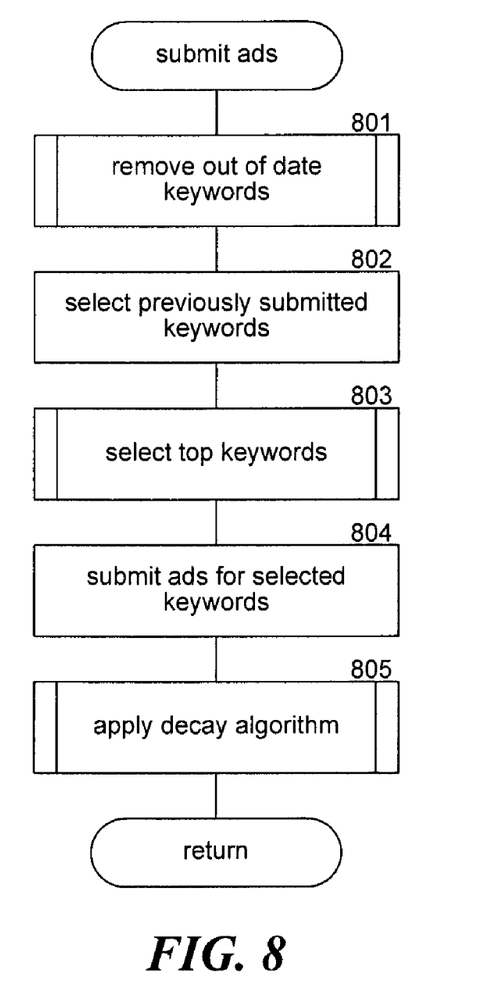
FIG. 8 is a flow diagram that illustrates the processing of the submit advertisement sets component of the advertisement system in some embodiments.

FIG. 8 is a flow diagram that illustrates the processing of the submit advertisement sets component of the advertisement system in some embodiments. The component determines from the keyword table which advertisement sets to submit to an advertisement placement service. In block 801, the component invokes the remove out-of-date keywords component to remove from the keyword table entries for keywords that have become out of date. In block 802, the component selects keywords from the keyword table that have had their advertisement sets submitted. In block 803, the component invokes the select top keywords component to identify which of the keywords are to have their advertisement sets submitted. In block 804, the component submits the advertisement sets for the selected keywords. In block 805, the component invokes the apply decay algorithm component to generate decay counts and then returns.

Figure 9:
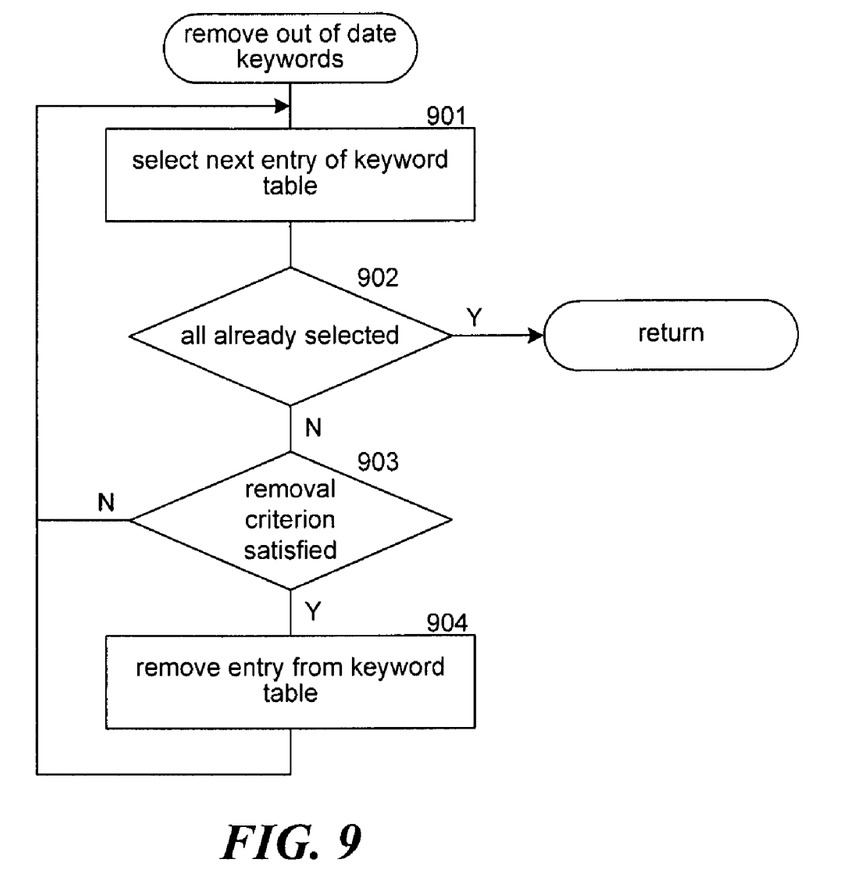
FIG. 9 is a flow diagram that illustrates the processing of the remove out-of-date keywords component of the advertisement system in some embodiments.

FIG. 9 is a flow diagram that illustrates the processing of the remove out-of-date keywords component of the advertisement system in some embodiments. The component removes entries of the keyword table that satisfy a removal criterion. In block 901, the component selects the next entry of the keyword table. In decision block 902, if all the entries have already been selected, then the component returns, else the component continues at block 903. In decision block 903, if a removal criterion is satisfied by the selected entry, the component removes the entry from the keyword table in block 904. The component then loops to block 901 to select the next entry of the keyword table. One skilled in the art will appreciate that various removal criteria may be used. For example, a removal criterion may be that the decay count is below a certain threshold, the profitability of the advertisement set is below a profitability threshold, and so on.

Figure 10:
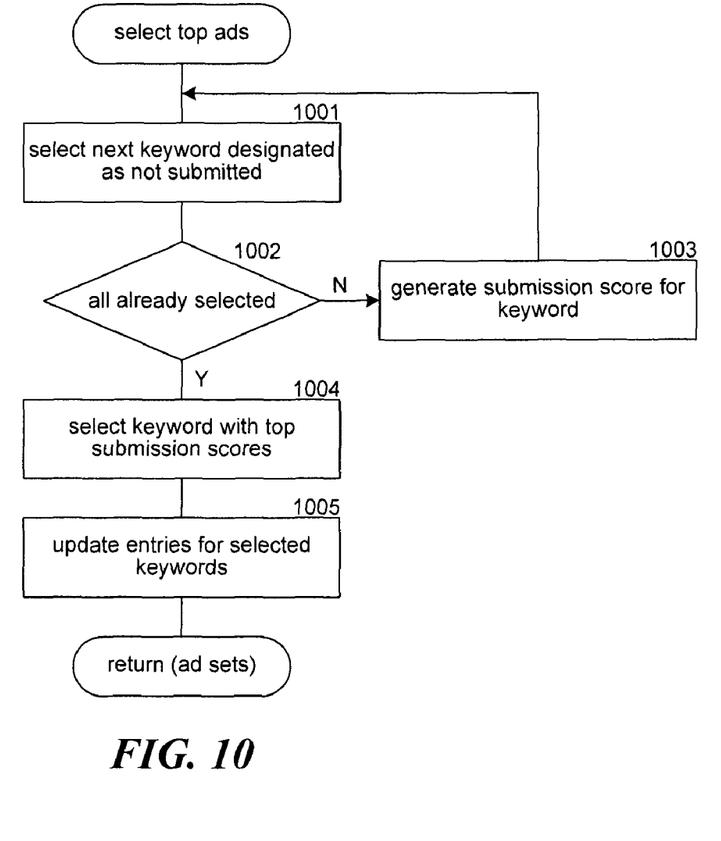
FIG. 10 is a flow diagram that illustrates the processing of the select top keywords component of the advertisement system in some embodiments.

FIG. 10 is a flow diagram that illustrates the processing of the select top keywords component of the advertisement system in some embodiments. The component selects keywords with advertisement sets that have not been placed from the keyword table and identifies those keywords that satisfy an advertisement submission criterion. In blocks 1001-1003, the component loops selecting each keyword from the keyword table for which advertisement sets have not been submitted and generates a submission score for the keyword. The submission score may be generated based on the advertisement category, the current count and the decay count, an advertisement score generated when the keyword was first identified, and so on. These scores may be combined in various linear and nonlinear ways to generate an overall submission score. In block 1004, the component selects the keywords with the top submission scores. For example, the component may select the top 100 keywords, may select the top 1% of the keywords, and so on. In block 1005, the component updates the entries for the selected keyword in the keyword table to indicate that their advertisement sets have been submitted. The component then returns the advertisement sets of the selected keyword.

Figure 11:
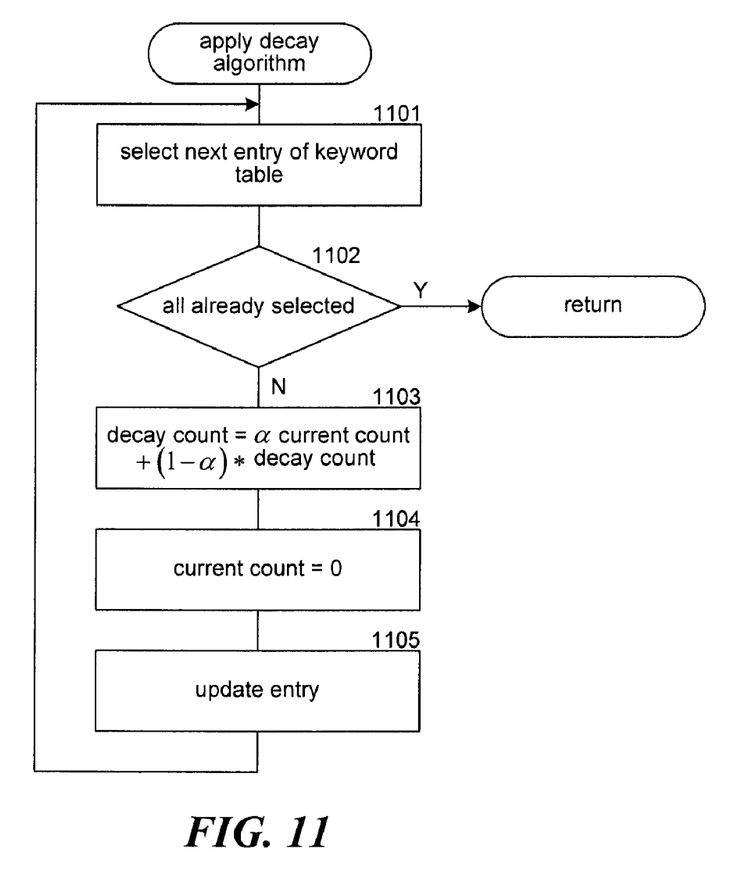
FIG. 11 is a flow diagram that illustrates the processing of the applied decay algorithm component of the advertisement system in some embodiments.

FIG. 11 is a flow diagram that illustrates the processing of the apply decay algorithm component of the advertisement system in some embodiments. The component selects each entry of the keyword table and updates its decay count. In block 1101, the component selects the next entry of the keyword table. In decision block 1102, if all the entries have already been selected, then the component returns, else the component continues at block 1103. In block 1103, the component updates the decay count based on the current account and the previous decay count. For example, the new decay count may be a linear or non-linear combination of the current count and the previous decay count. In block 1104, the component sets the current count to zero. In block 1105, the component updates the entry of the keyword table and then loops to block 1101 to select the next entry.

Although the subject matter has been described in language specific to structural features and/or methodological acts, it is to be understood that the subject matter defined in the appended claims is not necessarily limited to the specific features or acts described above. Rather, the specific features and acts described above are disclosed as example forms of implementing the claims. For example, the advertisement system may stop submitting advertisement sets for a keyword when a advertisement termination criterion is satisfied. For example, the advertisement termination criterion may be based on a certain time period, decrease in current count, analysis of decay count, and so on. As another example, new categories for keywords may be identified and new creatives and landing page links may be generated on a periodic basis (e.g., keyword extraction cycle) or a non-periodic basis. Accordingly, the invention is not limited except as by the appended claims.

We claim:

1. A non-transitory computer-readable storage medium containing instructions for controlling at least one computing device to identify keywords for advertisement placement, by a method comprising:
    extracting one or more keywords from an RSS-style syndicated web data feed, the extracted keywords being selected from the group consisting of proper names, statistically improbable phrases, capitalized phrases, and title of the data feed;
    for each extracted keyword,
        identifying a first category of products to advertise with the extracted keyword based at least in part on an expected category-ranked benefit for advertising with the extracted keyword in the first category of products, wherein a product in the first category is related to the keyword and the first category is related to the product but independent of a subject of the keyword;
        identifying a second category of products containing text, the identifying being based at least in part on at least one attribute of the text;
        determining scores for (1) the expected category-ranked benefit for advertising with the extracted keyword in the first category of products and (2) the text contained in the second category of products, the scores normalized to facilitate comparison;
        selecting either the first category or the second category based at least in part on the determined scores;
        generating a link for a landing page for the extracted keyword, the landing page for displaying search results of a query of the selected category based at least in part on the extracted keyword; and
        generating a creative for the extracted keyword; and
    submitting to an advertisement placement service an extracted keyword, the link for the extracted keyword, and the creative for the extracted keyword.

2. The at least one computer-readable medium computing system of claim 1 wherein the RSS-style syndicated web data feed is a data feed selected from the group consisting of a really simple syndication feed, a resource description framework site summary feed, and a rich site summary feed.

3. A method in a computing device for automatically identifying keywords for advertisement placement, the method comprising:
    extracting one or more keywords from a data feed, the data feed providing information about one or more content data;
    for each extracted keyword,
        identifying, facilitated by a computer processor, a category of products to advertise with the extracted keyword from among a plurality of categories of products, the products being related to the keyword but the category being independent of a subject of the keyword, the identification based at least in part on (1) an expected benefit of advertising in a first of the plurality of categories of products and (2) at least one attribute of text contained in at least one product of a second of the plurality of categories of products, the identification including selecting from among the first and the second of the plurality of categories of products based at least in part on scores determined for the expected benefit and the text, the scores normalized to facilitate comparison;
        generating a link for a landing page for the extracted keyword, the landing page for displaying search results of a query of the identified category based at least in part on the extracted keyword; and
        generating a creative for the extracted keyword; and
    submitting to an advertisement placement service an extracted keyword, the link for the extracted keyword, and the creative for the extracted keyword.

4. The method of claim 3 wherein the data feed is selected from the group consisting of a really simple syndication feed, a resource description framework site summary feed, and a rich site summary feed.

5. The method of claim 3 wherein the extracted keywords are selected from the group consisting of proper names, statistically improbable phrases, capitalized phrases, and title of the data feed.

6. The method of claim 3 wherein the identifying of the category is based at least in part on occurrences of the extracted keyword in a collection of documents.

7. The method of claim 3 wherein when the extracted keyword is a statistically improbable phrase, the identifying of the category is based at least in part on occurrences of the extracted keyword in a collection of documents.

8. The method of claim 3 wherein a multiplicity of keywords are extracted from a data feed and wherein submissions to an advertisement placement service are made for those keywords that satisfy an advertisement submission criterion.

9. The method of claim 8 wherein the advertisement submission criterion is based at least in part on statistics from previously processed data feeds that include the extracted keyword.

10. The method of claim 8 wherein the influence of previously processed data feeds on satisfying the advertisement submission criterion decays over time.

11. The method of claim 8 including re-submitting advertisement sets for keywords until an advertisement termination criterion is satisfied.

12. At least one non-transitory computer-readable storage medium containing instructions for controlling at least one computing device to identify a category of a landing page for an advertisement, by a method comprising:
- extracting a keyword from a data feed, the data feed providing information about one or more content data;
- identifying a first category of items to advertise using the keyword extracted from the data feed based at least in part on an expected category-ranked benefit for advertising items of the first category using the keyword, the items being related to the keyword but the first category being independent of a subject of the keyword;
- identifying a second category of items containing text, the identifying being based at least in part on at least one attribute of the text;
- determining scores for (1) the expected category-ranked benefit for advertising items of the first category using the keyword and (2) the text contained in the second category of products, the scores normalized to facilitate comparison;
- selecting either the first category or the second category for advertising using the keyword based at least in part on the determined scores;
- generating a link for a landing page for the extracted keyword, the landing page for displaying search results of a query of the selected category based at least in part on the extracted keyword;
- generating a creative for the extracted keyword; and
- submitting to an advertisement placement service the extracted keyword, the link for the extracted keyword, and the creative for the extracted keyword.

13. The at least one computer-readable medium of claim 12 wherein the second category is a category of books.

14. The at least one computer-readable medium of claim 12 wherein the category selection criterion is based at least in part on the expected category-ranked benefit from advertising using the keyword in the first category and in the second category.

15. The at least one computer-readable medium of claim 14 wherein the expected category-ranked benefit from advertising using the keyword in the second category is based at least in part on occurrences of the keyword within the documents of the collection.

16. The at least one computer-readable medium of claim 12 wherein the data feed is selected from the group consisting of a really simple syndication feed, a resource description framework site summary feed, and a rich site summary feed.

17. A computing device for automatically identifying keywords for advertisement placement, comprising:
- a feed store for storing items of RSS-style data feeds comprising at least one computer-readable medium;
- a processor; and
- a memory device including instructions that, when executed by the processor, cause the computing device to:
  - extract keywords from the items of the RSS-style data feeds, the data feeds providing information about one or more content data;
  - identify a category for advertising using an extracted keyword from among a plurality of categories of items, the items being related to the keyword but the categories being independent of a subject of the keyword and the identification based at least in part on (1) an expected benefit of advertising in a first of the plurality of categories of items and (2) at least one attribute of text contained in at least one item of a second of the plurality of categories of items, the identification including selecting from among the first and the second of the plurality of categories of items based at least in part on scores determined for the expected benefit and the text, the scores normalized to facilitate comparison;
  - generate a link for a landing page based at least in part on the extracted keyword and the identified category;
  - generate a creative based at least in part on the extracted keyword and the identified category; and
  - submit to an advertisement placement service an extracted keyword, the generated link for the extracted keyword, and the generated creative for the extracted keyword for advertisement placement.

18. The computing device of claim 17 wherein the RSS-style data feed is a data feed selected from a group consisting of a really simple syndication feed, a resource description framework site summary feed, and a rich site summary feed.

19. The computing device of claim 17 wherein when an extracted keyword is a statistically improbable phrase, the category is identified based at least in part on occurrences of the statistically improbable phrase in a collection of documents.

20. The computing device of claim 17 wherein a multiplicity of keywords are extracted from the RSS-style data feed and wherein submissions to an advertisement placement service are made for only those keywords that satisfy a advertisement submission criterion.

21. The computing device of claim 20 wherein the advertisement submission criterion is based at least in part on statistics from previously processed data feeds that include the extracted keyword.

22. The computing device of claim 21 wherein the influence of previously processed data feeds on satisfying the advertisement submission criterion decays over time.

23. The computing device of claim 22 wherein submissions for keywords are re-submitted until an advertisement termination criterion is satisfied.

24. A computer program product for controlling at least one computing device to identify keywords from a data feed, comprising one or more non-transitory computer-readable media collectively having thereon, at least:
- computer readable program code means for extracting one or more keywords from the data feed, the data feed providing information about one or more content data;
- computer readable program code means for identifying a category of products to advertise with an extracted keyword from among a plurality of categories of products, the products being related to the keyword but the categories being independent of a subject of the keyword and the identification based at least in part on (1) an expected benefit of advertising in a first of the plurality of categories of products and (2) at least one attribute of text contained in at least one product of a second of the plurality of categories of products, the identification including selecting from among the first and the second of the plurality of categories of products based at least in part on scores determined for the expected benefit and the text, the scores normalized to facilitate comparison;
- computer readable program code means for generating a link for a landing page for the extracted keyword, the landing page for displaying search results of a query of the identified category based at least in part on the extracted keyword;

computer readable program code means for generating a creative for the extracted keyword; and computer readable program code means for submitting to an advertisement placement service an extracted keyword, the link for the extracted keyword, and the creative for the extracted keyword.

25. The method of claim 3, wherein the ranking of one or more attributes of the category comprises a ranking based at least in part on a number of products in the category related to the extracted keyword.

26. The method of claim 3, wherein the ranking of one or more attributes of the category comprises a ranking based at least in part on a statistical profitability of advertisements for products in the category.

27. The method of claim 3, wherein the ranking of one or more attributes of the category comprises a ranking based at least in part on a statistical conversion rate of advertisements for products in the category.

\* \* \* \* \*